Oct. 21, 1958
J. BELART
2,857,572
ELECTRICAL PROBE
Filed Dec. 22, 1955
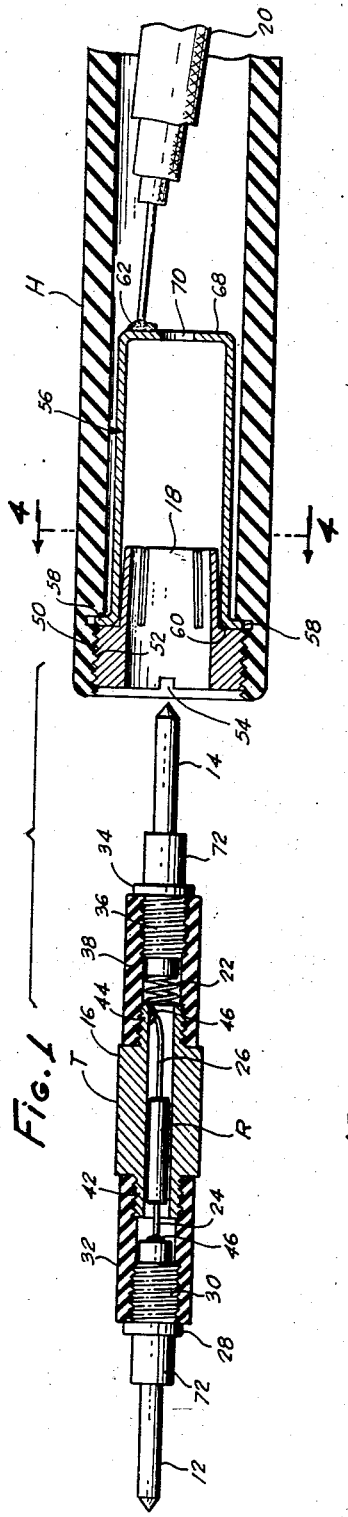
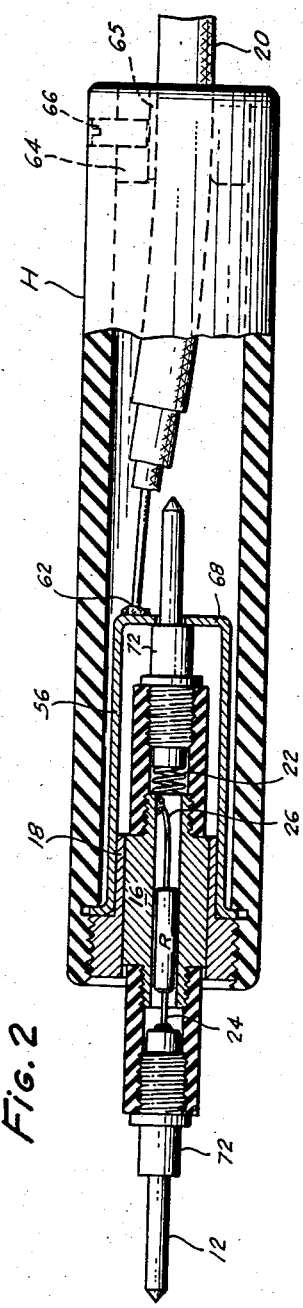
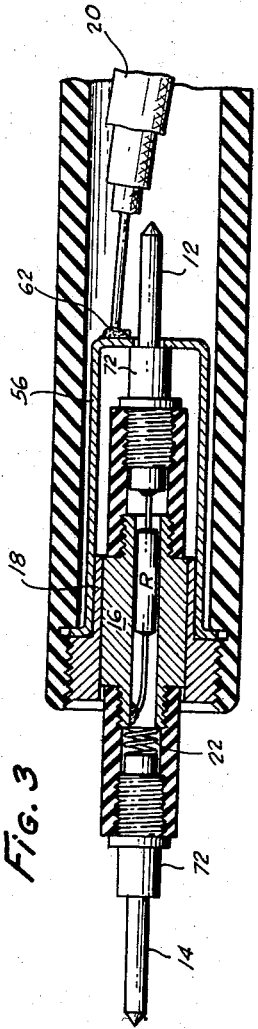
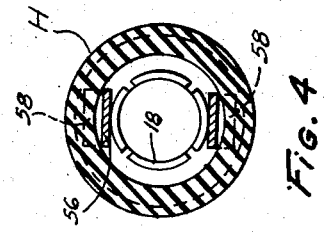
INVENTOR.
JOSE BELART
BY
*James and Franklin*
ATTORNEYS.

2,857,572

ELECTRICAL PROBE

Jose Belart, Jamaica, N. Y., assignor to Precision Apparatus Co., Inc., Glendale, N. Y., a corporation of New York Application December 22, 1955, Serial No. 554,797

5 Claims. (Cl. 324—149)

This invention relates to electrical probes, and more particularly to those intended for use with or without a resistor in series for isolation or for multiplying or other purpose.

The primary object of the present invention is to generally improve electrical probes. A more particular object is to provide a probe having a resistor which may be either connected in series between the tip and the connecting cable which leads to the meter or other instrument, or which may be cut out of circuit so that the tip is connected directly to the cable.

Another object of the invention is to provide a means to change the probe, which means is easily manipulated yet highly frictional, so that it will not shift accidentally. A further object is to provide means for producing a good electrical contact between the movable parts. A further object is to provide a switching arrangement which does not increase the overall size of the probe. Still another object is to provide a switching means which does not require a switch handle projecting from the side of the probe handle. Differently expressed, the probe handle remains smooth, cylindrical and unmarred, and the probe may be used in any rotative position around its longitudinal axis.

Another object is to provide a probe having a reversible tip assembly with oppositely directed tips at its ends, the said assembly being removable for insertion in the handle with either tip projecting therefrom. When one tip is used the resistor is in circuit, and when the other tip is used the resistor is not in circuit.

To accomplish the foregoing general objects, and other more specific objects which will hereinafter appear, my invention consists in the probe elements, and their relation one to another, as are hereinafter more particularly described in the following specification. The specification is accompanied by a drawing in which:

Fig. 1 is a longitudinal section through the probe with the tip assembly removed therefrom;

Fig. 2 is a longitudinal section through the probe with the tip assembly inserted in the handle;

Fig. 3 is a similar section but showing the tip assembly reversed end for end; and Fig. 4 is a transverse section through the handle portion taken approximately in the plane of the line 4—4 of Fig. 1.

Referring to the drawing, and more particularly to Fig. 1, the probe comprises a handle generally designated H and a reversible tip assembly generally designated T. As will be seen from the drawing, this tip assembly has oppositely directed tips 12 and 14 at its ends, and these are connected by a hollow body at least a part of which is insulation. A resistor cartridge R is disposed inside the body, and is preferably electrically connected in series between the tips, one of which is also electrically connected to a contact 16 on the outside of the body. The handle H has a mating contact 18 at its forward end, and the flexible cable 20 is electrically connected to the contact 18.

The tip assembly T may be inserted in the handle H with either end foremost. In the position shown in Fig. 3 the cable 20 is connected to the exposed tip 14, the latter being connected through spring 22 to the outside contact 16, and thence through the handle contact 18 and a member 56 to the cable 20. At this time the resistor R is bypassed or out of circuit.

In the position shown in Fig. 2 the exposed tip 12 is connected to the cable 20 through the resistor R. More specifically the tip 12 is connected to the wire lead 24 of resistor R, and the opposite wire lead 26 of resistor R is connected to the outside contact 16, which is connected through the handle contact 18 and member 56 to the cable 20.

Considering the preferred arrangement in greater detail, except for the member 56, the parts are all circular in section. Reverting to Fig. 1, the reversible tip assembly T comprises a metal tip 12 formed integrally with a collar 28 and a threaded part 30. This is screwed into the internally threaded end of an insulation bushing 32. Similarly the tip 14 is formed integrally with a collar 34 and a threaded part 36, which is screwed tightly into the internally threaded end of another insulation bushing 38. The outside contact 16 previously mentioned is preferably the exterior surface of a cylindrical metal portion which receives the bushing 32 at one end, and the bushing 38 at the other end. More specifically, the metal cylinder 16 has integral threaded studs 42 and 44, and the bushings 32 and 38 are matingly internally threaded. Thus the parts 12, 32, 16, 38 and 14 may all be screwed tightly together to form a rigid reversible tip assembly.

Before putting the parts together one lead 24 of resistor R is soldered to the inner end of tip 12, as is indicated at 46. The parts 12, 32 and 16 are then assembled with the other lead 26 of resistor R projecting through the threaded part 44 of cylinder 16. The lead 26 is then soldered to the inner wall or and the end of stud 44, following which the spring 22 and the parts 38 and 14 are added to the assembly. Completion of the assembly compresses the spring 22, thereby establishing contact between the spring and tip 14 on the one hand, and between the spring and the metal cylinder 16 on the other.

The handle H is preferably a piece of tubular insulation material. The forward end is threaded, as indicated at 50, to receive the contact 18, which is matingly externally threaded at 52. The contact 18 is preferably a cylindrical contact formed by longitudinally slitting a cylindrical member with a plurality of slits to form spring fingers which are shaped inwardly slightly. The outer end of the contact member may be provided with diametrically opposite slots 54 which receive a spanner wrench or other tool to facilitate screwing the contact tightly into the handle.

The handle is preferably provided with a stop member 56. As here shown, this stop member consists of a metal strip bent to U shape with the closed end of the U inserted foremost into the handle. The free ends of the U are preferably bent outwardly, as indicated at 58 (Fig. 1), and are there clamped in position by the shoulder 60 on contact member 18. The cable 20 is soldered to the stop member 56, as shown at 62, and it will be understood that the circuit is carried to the contact 18, both because of the frictional insertion of the slit finger parts 18 between the sides of the U 56, as is best shown in Fig. 4, and also because of the tightening of the shoulder 60 against the outwardly bent tips 58 of the U, as shown in Figs. 1, 2 and 3.

In assembling the parts it will be understood that the cable 20 may be soldered to the stop member 56 before sliding the cable and stop member through the handle in a direction from the forward end toward the rear end. If desired the cable may be anchored to prevent pull on the soldered connection, this being shown in Fig. 2 in which the handle includes an insulation collar 64 and a blunt set screw 66, which bear against a flat metal step 65 which is inserted between the collar and the cable.

The closed end 68 of the stop member is preferably apertured as shown at 70 in Fig. 1. The hole 70 is large enough to readily clear either tip 12 or 14. However, the hole is too small to clear the enlarged portion 72 at the base of the tip, and thus the insertion of the reversible tip assembly in the handle is positively limited by the stop member, as will be seen in Figs. 2 and 3.

The materials employed are not critical, but by way of example it may be stated that in the particular probe here illustrated the tips 12 and 14 and the cylindrical contact portion 40 are all made of brass. The insulation bushings 32 and 38 may be made of a phenol formaldehyde resin. The stop member 56 is made of steel, while the handle contact 18 is made of half hard brass. The handle H is made of an acetate plastics material, but may also be made of a phenol formaldehyde resin. This statement of materials is not intended to be in limitation of the invention.

The probe is ordinarily employed with a vacuum tube voltmeter. In such case it is customary to put the resistor in series when probing a D. C. circuit, and to short circuit the resistor when probing an A. C. circuit. However, the probe may be used as a multiplier and in other ways and with other instruments than a vacuum tube voltmeter. It may be used in any situation where it is desired at will to put an impedance, typically a resistor, between the tip and cable of a probe.

It is believed that the method of constructing and using my improved probe, as well as the advantages thereof, will be apparent from the foregoing detailed description. The handle may be smooth, cylindrical and unmarred by a projecting switch lever or the like. When the probe is in use, one tip only is exposed. The metal cylinder 16 at the middle of the reversible tip assembly is housed within the handle. The part of the tip assembly which projects from the handle is the insulation part. The assembly is readily accessible for intentional withdrawal and reversal, but it is unlikely to experience accidental movement because of the tight frictional fit of the assembly in the cylindrical spring holding the same. The cylindrical nature of all of the parts makes it possible to rotate the tip assembly relative to the handle without in any way affecting the assembly. It also makes for inexpensive manufacture, for the insulation parts may be simply lengths of tubular material, and the other parts are essentially machine screw fittings, or may be manufactured as such.

The resistor in the probe may be used for several purposes. One is to act as a multiplier for the meter or instrument to which the probe is connected. Another is to provide isolation between the input capacitance of a vacuum tube voltmeter and a circuit being tested. When the vacuum tube voltmeter is switched to its A. C. testing position the resistor is not required. Also when the vacuum tube voltmeter is switched for use as an ohm meter, the resistor is not required. In either case it is readily shunted out of circuit by reversing the tip assembly of the probe here disclosed.

It will be understood that while I have shown and described my invention in several preferred forms, changes may be made in the structures shown, without departing from the scope of the invention, as sought to be defined in the following claims.

I claim:

1. An electrical probe comprising an insulation handle, a spring grip contact secured within the forward end of said handle, a flexible cable extending through the rear end of said handle and electrically connected to the spring grip contact, a reversible tip assembly comprising a tip at one end secured to an insulation bushing, an oppositely directed tip at the other end secured to an insulation bushing, a metal part receiving one bushing at one end and the other bushing at the other end, the resulting assembly forming a hollow structure with oppositely directed tips insulated from one another and with a metal outside contact portion intermediate said ends, a resistor cartridge in said hollow structure connected in series between said tips, and means connecting one of said tips to said metal contact portion, the latter being dimensioned to be received with a frictional spring grip by the aforesaid spring grip contact at the forward end of the handle, the resulting arrangement being such that when the assembly is inserted in the handle in one direction the cable is connected directly to the exposed tip, and when the assembly is inserted in the handle in opposite direction the cable is connected to the concealed tip and thence through the resistor to the exposed tip.

2. An electrical probe comprising a cylindrical insulation handle, a cylindrical spring grip contact secured concentrically within the forward end of said handle, a flexible cable extending through the rear end of said handle and electrically connected to the spring grip contact, a reversible tip assembly comprising a tip at one end secured concentrically to an insulation bushing, an oppositely directed tip at the other end secured concentrically to an insulation bushing, a metal cylinder receiving one bushing at one end and the other bushing at the other end, the resulting assembly forming a hollow concentric cylindrical structure with oppositely directed tips insulated from one another and with a cylindrical metal outside contact portion intermediate said ends, a resistor cartridge in said hollow structure connected in series between said tips, and means connecting one of said tips to said cylindrical metal contact portion, the latter being dimensioned to be received with a frictional spring grip by the aforesaid spring grip contact at the forward end of the handle, the resulting arrangement being such that when the assembly is inserted in the handle in one direction the cable is connected directly to the exposed tip, and when the assembly is inserted in the handle in opposite direction the cable is connected to the concealed tip and through the resistor to the exposed tip.

3. An electrical probe comprising a cylindrical insulation handle, a cylindrical spring grip contact secured within the forward end of said handle, a U-shaped stop element inserted with its closed end foremost into said handle, the forward free ends of said stop element being turned outward and a part of said cylindrical contact being secured thereagainst, a flexible cable extending through the rear end of said handle to the stop element, a reversible tip assembly comprising a tip at one end secured to an insulation bushing, an oppositely directed tip at the other end secured to an insulation bushing, a metal cylinder receiving one bushing at one end and the other bushing at the other end, the resulting assembly forming a hollow cylindrical structure with oppositely directed tips insulated from one another and with a cylindrical metal outside contact portion intermediate said ends, a resistor cartridge in said hollow structure connected in series between said tips, and means connecting one of said tips to said cylindrical metal contact portion, the latter being dimensioned to be received with a frictional spring grip by the aforesaid spring grip contact at the forward end of the handle, said stop element having a hole in its closed end dimensioned to receive either tip and to arrest further insertion of the assembly, at which time the spring grip contact engages the outside contact portion, the resulting arrangement being such that when the assembly is inserted in the handle in one direction the cable is connected directly to the exposed tip, and when the assembly is inserted in the handle in opposite direction the cable is connected to the concealed tip and through the resistor to the exposed tip.

4. An electrical probe comprising a tip assembly and a handle detachably receiving the same, a contact in the forward end of the handle, a flexible cable extending through the rear end of the handle to the contact, said tip assembly being a reversible tip assembly having oppositely pointed tips at the ends, means insulating said tips from one another, a resistor connected in series between the tips and forming a part of the tip assembly, a contact on the outside of the reversible tip assembly to engage the contact at the forward end of the handle when said assembly is inserted into the handle, and means connecting one of said tips to the outside contact on the assembly, whereby when the reversible tip assembly is inserted in the handle in one direction the cable is connected directly to the exposed tip, and when the reversible tip assembly is inserted in the handle in opposite direction the cable is connected to the same but then concealed tip and thence through the resistor to the then exposed tip.

5. An electrical probe comprising a handle, a contact in the forward end of the handle, a flexible cable extending through the rear end of the handle to the contact, and a reversible tip assembly having oppositely directed tips at the ends connected by a tubular body at least a part of which is insulation, said insulation serving to insulate the tips from one another, a resistor cartridge inside the tubular body connected in series between the tips, a contact on the outside of the body to engage the contact at the forward end of the handle when said assembly is inserted into the handle, and means connecting one of said tips to said outside body contact, whereby when the reversible tip assembly is inserted in the handle in one direction the cable is connected directly to the exposed tip, and when the reversible tip assembly is inserted in the handle in opposite direction the cable is connected to the same but then concealed tip and thence through the resistor to the then exposed tip.

References Cited in the file of this patent

UNITED STATES PATENTS

| | | |
|---|---|---|
| 2,552,981 | Lamb | May 15, 1951 |
| 2,673,958 | Banus | Mar. 30, 1954 |